United States Patent [19] [11] 4,407,748
Gorbacheva et al. [45] Oct. 4, 1983

[54] AZO DYESTUFFS POSSESSING ANTIMICROBIAL PROPERTIES

[75] Inventors: Irina N. Gorbacheva; Zinaida J. Kozinda; Elena G. Suvorova; Viktor A. Chertov; Semen I. Dvoskin; Evdokia V. Platonova; Tatyana A. Podgaevskaya; Andrei B. Skvirenko, all of Moscow, U.S.S.R.

[73] Assignee: Tsentralny Nauchno-Issledovatelsky Institut, Moscow, U.S.S.R.

[21] Appl. No.: 129,903

[22] Filed: Mar. 13, 1980

[30] Foreign Application Priority Data

Mar. 13, 1979 [SU] U.S.S.R. ................ 2729601

[51] Int. Cl.³ .................. C09B 62/09; C09B 62/503; D06P 1/382; D06P 1/384
[52] U.S. Cl. .................. 260/153; 260/174; 260/177; 260/184; 260/187; 260/197; 260/198; 260/199; 260/200; 260/458 C; 260/507 R; 424/226; 544/218
[58] Field of Search .............. 260/174, 177, 184, 187, 260/188, 153, 146 T

[56] References Cited

FOREIGN PATENT DOCUMENTS 1203824 9/1970 United Kingdom ............... 260/174

Primary Examiner—Floyd D. Higel
Attorney, Agent, or Firm—Lilling & Greenspan

[57] ABSTRACT

Azo dyestuffs, possessing antimicrobial properties, having the formula:

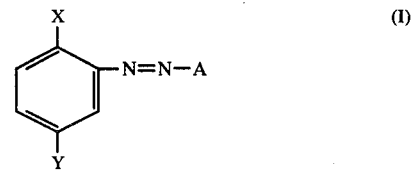

wherein X is $-OCH_3$ or $-SO_3Na$, Y is

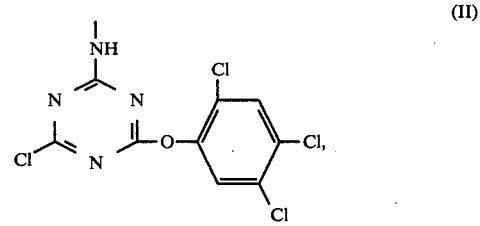

or $-SO_2CH_2CH_2OSO_3Na$, A is a derivative of naphthalene containing one or more of the following groups $-OH$, $-NH_2$,

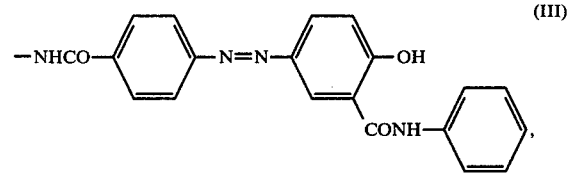

$-SO_3Na$.

The use of the azo dyestuffs according to the present invention makes it possible to considerably simplify the process of finishing of fibrous materials. Antimicrobial properties are imparted simultaneously with the dye to both protein and cellulose fibrous materials.

2 Claims, No Drawings

AZO DYESTUFFS POSSESSING ANTIMICROBIAL PROPERTIES

FIELD OF THE INVENTION

The present invention relates to the synthesis of azo dyestuffs and finishing of fibrous materials in order to impart thereto, simultaneously with coloration, antimicrobial properties. These azo dyestuffs are useful in finishing of the fibrous materials employed in shipbuilding, automobile industry, aviation, cable manufacture, as well as in melioration.

BACKGROUND OF THE INVENTION

Textile materials undergo biological degradation. About 40% of the damage is due to the effect of microorganisms.

The vital activity of fungi and bacteria results in the reduced mechanical strength of a material, color change, stains and stale odor.

The use of materials with antimicrobal properties makes it possible to extend the service life of these materials and thus avoid damage caused by biological degradation.

The manufacture of biologically active fibrous materials can be effected either by the method of impregnation with antimicrobial preparations, or by adding the latter by means of chemical bonding to functional groups of the fiber-forming polymers.

Known in the art are compounds and compositions which impart antimicrobial properties to fibrous materials during impregnation with aqueous solutions and solutions in organic solvents containing, as the biologically active components:

(1) salts of metals and organometallic compounds;
(2) derivatives of phenols and salicylic acids;
(3) salts of different-structure quaternary ammonium bases;
(4) antibiotics and organic compounds of various structure.

A practical importance is given to antiseptics capable of forming, with functional groups of the fiber, a certain type of chemical bonding. In this case the treated materials exhibit better fastness to wet treatment and the antimicrobal effect is preserved throughout the service life of the article.

Among the compositions suitable for the biocidal treatment of textile materials, there is great interest in dyestuffs possessing biological activity due to the presence of antiseptic groups that form a definite type of bonding with molecules of the fibrous material.

In the use of such dyestuffs two processes are combined, namely: dyeing and antimicrobial treatment. The combination of these two processes makes it possible to simplify processing the fibrous material, while improving its fastness. This is economically advantageous. Eliminating of the additional treatment with antiseptics is advantageous from an ecological standpoint, since it lowers the risk of polluting of the environment and waste waters with harmful products.

Known in the art are bactericidal triazine dyestuffs (of USSR Inventor's Certificate No. 455610 published June 30, 1978; USSR Inventor's Certificate No. 392716 published June 30, 1978), wherein as the bactericidally active substance use is made of residues of sulphacetamide, hexachlorophene chloromycetin, and the like. These dyestuffs, along with dyeing, impart the ability to inhibit growth of the bacteria *Staphylococcus aureus* in the treated textile materials, but do not suppress the activity of mold fungi degrading fibrous materials.

To impart fungical properties to protein fibrous materials, acid azo dyestuffs have been developed (cf. USSR Inventor's Certificate No. 401169, published March, 1976).

These azo dystuffs color protein fibrous materials, forming ionic, hydrogen and other bonds with the fibers.

The dyed materials possess good fastness against the effect of mold fungi when operating under conditions tropical climate, i.e. at increased humidity and elevated temperature. However, it should be noted that these azo dyestuffs color only protein materials.

SUMMARY OF THE INVENTION

It is an object of the present invention to provide novel azo dyestuffs capable of imparting antimicrobal properties to protein and cellulose fibrous materials in addition to dyeing.

This and other objects of the present invention are accomplished by the provision of azo dyestuffs possessing antimicrobial properties and having the formula:

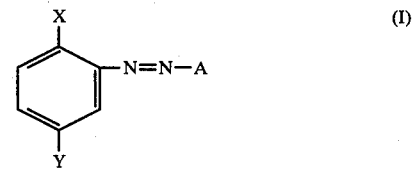

wherein X is —OCH$_3$ or —SO$_3$Na, Y is

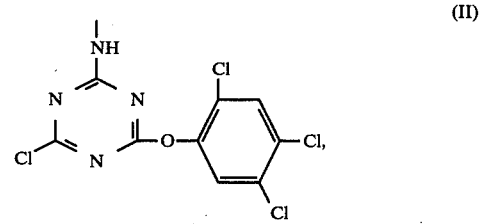

or —SO$_2$CH$_2$CH$_2$OSO$_3$Na, A is a derivative of naphthalene containing one or more of the following groups —OH, —NH$_2$,

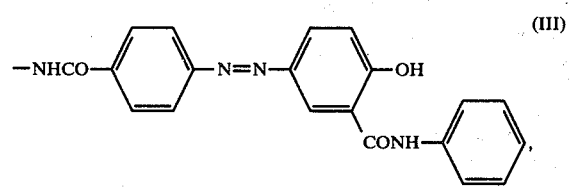

SO$_3$Na.

Owing to the use of said novel compounds for dyeing fibrous materials the following advantages are attained:

(1) the process of finishing fibrous materials is substantially improved;
(2) the fabric feel remains unchanged;
(3) the antimicrobial effect is ensured simultaneously with dyeing without changing the fabric weight;
(4) the antimicrobial properties of the fibrous material are retained during the entire period of use of the material;

(5) the antimicrobial properties with simultaneous dyeing are imparted to both protein and cellulose fibrous materials;

(6) the range of azo dyestuffs and biologically active substances such as fungicides is considerably broadened.

DETAILED DESCRIPTION OF THE INVENTION

The synthesis of the azo dyestuffs according to the present invention is effected by a conventional method comprising diazotization of an aromatic amine and the subsequent coupling with a naphthalene derivative containing one or more of the following groups: —OH, —NH₂,

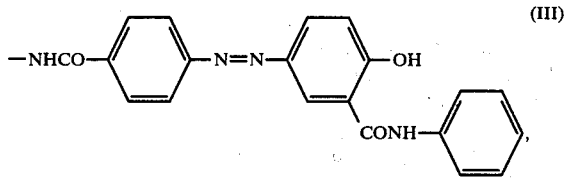

—SO₃Na, which groups can be located in various positions on the aromatic ring.

For a better understanding of the present invention, some specific examples are given hereinbelow by way of illustration.

EXAMPLE 1

Prepared is the azo dye of the formula:

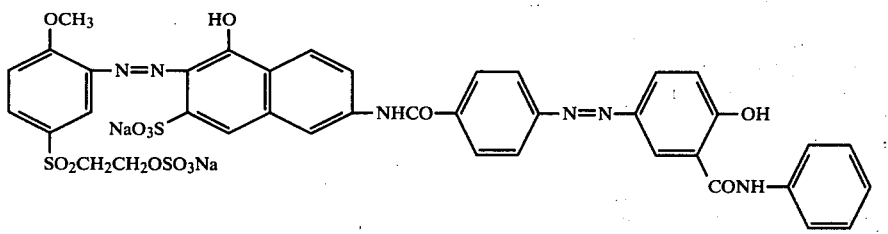

$C_{39}H_{30}N_6O_{14}S_3Na_2$. Molecular weight 948.

The preparation procedure involves the following stages.

(a) 2.66 g (0.0075 M) of a 87.6% sulphuric acid ester of 4-(2'-sulphatoethylenesulphonyl)2-aminoanisole are suspended in 10 ml of water, added with 1 ml (0.011 M) of a 34% hydrochloric acid, cooled to a temperature of from 0° to 5° C. and added with a solution of 0.5 g (0.0075 M) of sodium nitrite in 2 ml of water. Then the reaction mixture is allowed to stand for one hour.

(b) A solution of 3.1 g (0.0075 M) of a 87% 1-hydroxy-6-(4'-aminobenzoyl)-aminonaphthalene-3-sulphonic acid in 10 ml of water containing 1.45 g of soda ash is added to the suspension of the diazo compound produced in stage (a), where after stirring is effected for 2 hours at a temperature of 18° C. for 2 hours to give a monoazodye which is precipitated.

(c) The reaction mass produced in stage (b) containing the precipitated monoazodye is acidified by adding 1 ml of a 34% hydrochloric acid and diazotized by adding 0.52 g (0.0075 M) of sodium nitrite in 3 ml of water. Then the reaction mass is allowed to stand for one hour at a temperature of 20° C.

(d) 1.6 g (0.0075 M) of salicylanilide are dissolved in 0.65 ml of a 49% solution of caustic soda (0.012 M) and 0.5 g (0.0049 M) of soda ash is added thereto. The thus-prepared solution is added to the diazocompound of the monoazodye prepared in stage (c) and stirred. Then the azodye is salted out by the addition of common salt. The yield of the azodye is 4.3 g, which corresponds to 60.8% of the theoretical value.

The resulting dye dyes wool fabric to an orange color and cotton fabric—to a red color.

EXAMPLE 2

Prepared is the azodye of the formula:

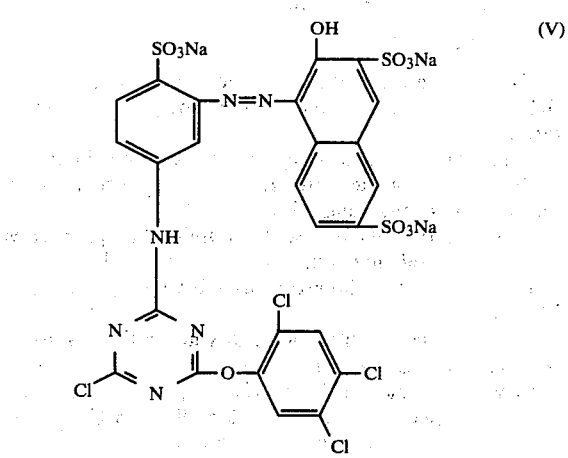

$C_{25}H_{11}N_6O_{11}S_2Cl_4Na_3$. Molecular weight 846.

The preparation procedure comprises the following stages.

(a) 3.22 g (0.006 M) of sodium 2-(2',4',5'-trichlorophenoxy)-4-(3'-amino-4'-sulphophenyl) amino-6-chloro-S-triazine are rubbed with 1.36 ml (0.014 M) of 35% hydrochloric acid. Then 20 ml of water are added under mechanical stirring, cooled to a temperature of 1°–3° C. and a solution of 0.42 g (0.006 M) of sodium nitrite in 20 ml of water is gradually added thereto. The reaction proceeds in an acidic medium—test by a paper congo indicator. At the end of the reaction the test is effected using iodine-starch paper and paper congo indicator.

(b) 2.1 g (0.006 M) disodium-2-naphthol-3,6-disulphonic acid are dissolved in 30 ml of water. The solution is filtered and cooled to a temperature of 15° C. Then to the solution, at a temperature of 15°–20° C., there is gradually added for one hour a suspension of the diazocompound prepared in stage (a). The medium pH is maintained within the range 6.4–6.6 by the addition of a solution of soda ash. After the addition of the entire amount of the suspension of the diazocompound stirring is continued for one hour. The resulting azo dye is salted out by the addition of common salt. The yield of the azodye is 3.26 g which is 64% of the theoretical value.

The resulting dye dyes wool fabric to an orange-brown color and cotton fabric—to a pink color.

EXAMPLE 3

Prepared is the azodye of the formula:

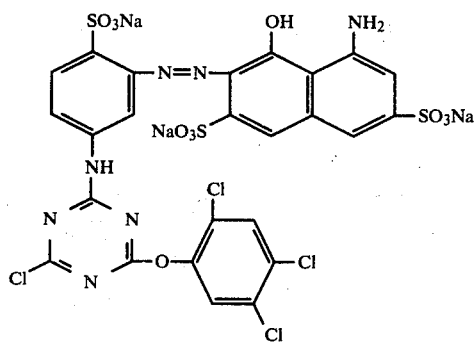

$C_{25}H_{12}N_7O_{11}S_3Cl_4Na_3$. Molecular weight 893.

The preparation procedure involves the following stages.

(a) The reaction of diazotization of 0.006 M of sodium 2-(2',4',5',-trichlorophenoxy)-4-(3'-amino-4'-sulphophenyl)-amino-6-chloro-S-triazine is carried out under the conditions of stage (a) of Example 2.

(b) 2.1 g (0.006 M) of monosodium salt of 1-hydroxy-8-aminonaphthalene-3,6-disulphonic acid are dissolved in 30 ml of water with the addition of 0.3 g (0.003 M) of soda ash. The solution is filtered-off and cooled to a temperature of 15° C. Then to the solution at a temperature of 15°–20° C. there is gradually added for one hour the suspension of the diazocompound prepared in stage (a). The reaction mass pH is maintained within the range of 7–8 by the addition of a solution of soda ash. After the addition of the entire amount of the diazocompound suspension stirring is continued for an additional one hour. Then the azodye is salted out by the addition of common salt. The yield of the azodye is 2.9 g which is 53% of the theoretical value.

The resulting azodye dyes wool fabric to a pink color, cotton fabric—to lilac color.

The azodyes prepared in the above Examples (formulae IV, V, VI) are used to dye samples of all-wool and cotton fabrics.

The dyeing formulation for all-wool fabric (percent by weight of the fabric):

| Azodye | 3 |
|---|---|
| Glauber salt | 10 |
| Acetic acid, 30% | 5 |
| Cationic surfactant | 1 |

The azodye is rubbed to a paste with a small amount of cold water, diluted with hot (80°–90°) water and agitated till complete dissolution of the dye.

Into a bath heated to a temperature of 30°–40° C., there is added a solution of Glauber salt, then acetic acid and the fabric sample to be dyed is immersed thereinto. It is treated for 10 minutes. Thereafter, the prepared solution of the azodye is poured into the bath and dyeing of the sample is effected for 10 minutes. The liquid-to-goods ratio is 50:1. The bath is gradually, over one hour, heated to reflux and dyeing is effected at this temperature for one hour. Then the bath is cooled and the dyed sample is thoroughly rinsed with water.

The dyeing formulation for a cotton fabric is as follows.

| Azodye | 3–6% by weight of the fabric |
|---|---|
| Urea | 50 g/l |
| Common salt | 30 g/l |
| Trisodium phosphate | 15 g/l. |

The azodye is rubbed into a paste with urea, diluted with water and dissolved under continuous stirring and heating to a temperature of from 50° to 70° C. The thus-prepared solution of the azodye is filtered and introduced into the dyeing bath heated to a temperature of from 30° to 40° C. Then the fabric sample is preliminarily wetted with warm water, squeezed and is immersed into the dyeing bath. 10 minutes after the beginning of the dyeing process, a solution of common salt is added to the bath (the dyed sample during this operation is removed) and the bath temperature is brought to 70° C. 30 minutes after the beginning of the dyeing process an alkali agent is added to the bath and dyeing is continued for another 60 minutes at a temperature of 70° C. The dyed fabric is rinsed with cold running water and then treated twice for 30 minutes with a solution of a non-ionic surfactant with a concentration of 2 g/l at a temperature of 60° C., whereafter it is washed with hot and cold running water.

For dyeing of fibrous materials, use may be made of any other known dyeing method employed for dyeing fibrous materials with dyestuffs pertaining to this class.

The results of the testing of dyed fabric samples for antimicrobial properties and fastness of the dyeings to various physico-cheimcal factors are given in the Table hereinbelow. The dyeing fastness of the samples to physico-chemical factors is assessed in points. Antimicrobial properties of the dyed fabric samples are assessed by their fungal resistance (bio-resistance). The method comprises keeping said samples infected with spores of mold fungi under the conditions optimal for their growth, followed by the evaluation of fungal resistance according to the IEC (Internation Electrical Engineering Comission) Recommendation. For the test use is made of an aqueous suspension of spores of the following species of mold fungi:

1. *Aspergillus niger* (v. Tiegh)
2. *Aspergillus amstelodami* (Mong)
3. *Penicilium cyclopium* (Westl)
4. *Penicilium brevicompactum* (Dierckx)
5. *Paecelomyces varioti* (Bain)
6. *Stachybotrys atra* (Corda)
7. *Chactomium globosum* (Kunze)
8. *Aspergillus versicolor* (Tierab)
9. *Aspergillus flavus* (Zink)
10. *Trichoderma lignorum* (Harz).

TABLE

| Fabric sample characteristic 1 | Bio-resistance, points 2 | Color fastness, points, to: | | | |
|---|---|---|---|---|---|
| | | Distilled water 3 | Dry rubbing 4 | Perspiration 5 | Dry cleaning 6 |
| Wool Fabric | | | | | |
| Dyed with the azodye (IV) | 0–1 | 5/5/5 | 3 | 5/5/4 | 5/5/5 |
| Dyed with the azodye of | | | | | |

TABLE-continued

| Fabric sample characteristic 1 | Bio-resistance, points 2 | Color fastness, points, to: | | | |
|---|---|---|---|---|---|
| | | Distilled water 3 | Dry rubbing 4 | Perspiration 5 | Dry cleaning 6 |
| formula (V) | 0 | 5/5/5 | 5 | 5/5/5 | 5/5/5 |
| Dyed with the azodye of formula (VI) | 0 | 5/5/5 | 4 | 5/5/5 | 5/5/5 |
| Non-dyed sample | 3-4 | — | — | — | — |
| Cotton Fabric | | | | | |
| Dyed with the azodye of formula (VI) | 0-1 | 5/5/4 | 4-5 | 4/3/4 | — |
| Dyed with the azodye of formula (IV) | 0-1 | 5/2/2 | 3-4 | 3/3/4 | — |
| Non-dyed sample | 4 | — | — | — | — |

As can be seen from the above Table, protein and cellulose fibrous materials dyed with the azodyes prepared in the foregoing Examples 1 to 3 feature good fungal resistance equal to 0-1 point (the fibrous materials having 0 to 2 point assessment being regarded as bio-resistant). The color fastness characteristics with respect to various physico-chemical factors are matching those inherent in known dyestuffs of this class produced on a commercial scale.

The azodyestuffs according to the present invention make it possible to considerably simplify the process of finishing protein and cellulose materials and increase, by 2 times, the labor productivity due to combination of two treatment processes—dyeing and antimicrobial treatment, elimination of the use of the chemicals (antiseptics and auxiliary agent) necessary to achieve the same properties by other treatment processes. This elimination of the additional treatment with antiseptics is advantageous from the ecological standpoint, since it minimizes pollution of the environment and waste waters with harmful products.

What is claimed is:

1. An azo dyestuff composition of matter possessing antimicrobial properties, having the formula:

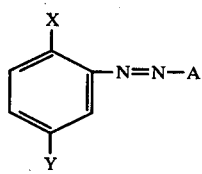

wherein
A is

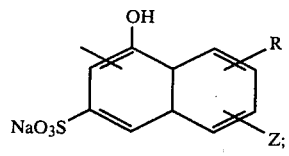

X is —OCH$_3$;
Y is —SO$_2$CH$_2$CH$_2$OSO$_3$Na;
Z is

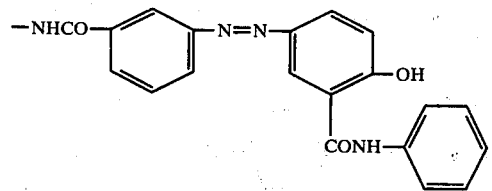

and
R is —H.

2. A azo dyestuff composition of matter possessing antimicrobial properties, having the formula:

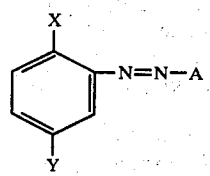

wherein
A is

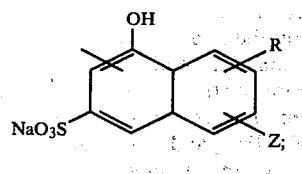

X is —SO$_3$Na;
Y is

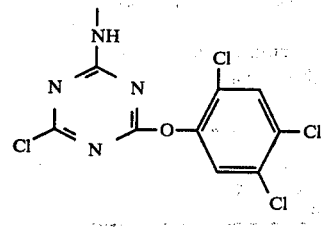

Z is —SO$_3$Na; and
R is —H or —NH$_2$.

* * * * *